Oct. 27, 1959        C. J. MANN        2,910,301
RETRACTABLE WORK-SUPPORT
Filed Oct. 13, 1958        2 Sheets-Sheet 1
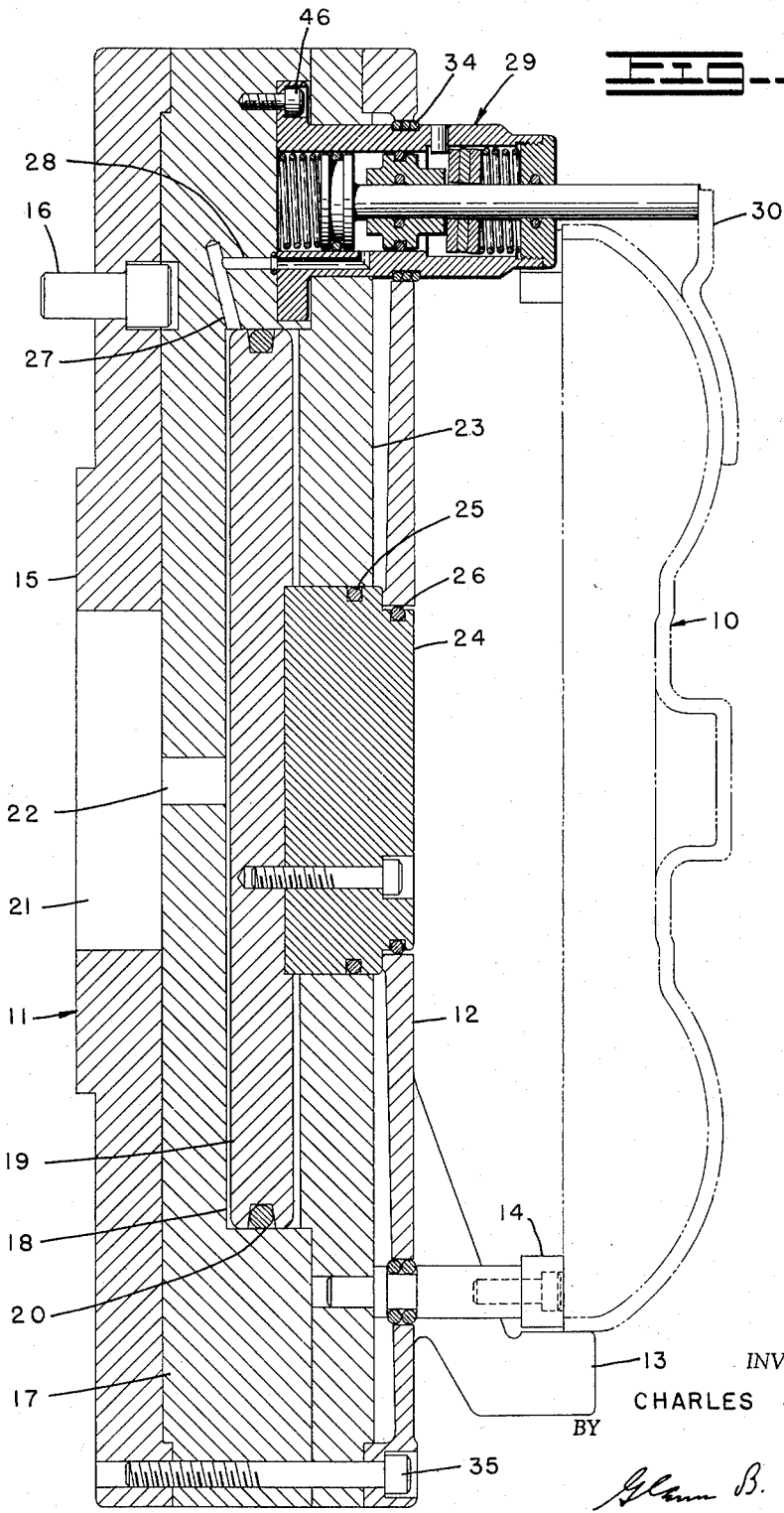
INVENTOR:
CHARLES J. MANN
BY
Glenn B. Moore
atty.

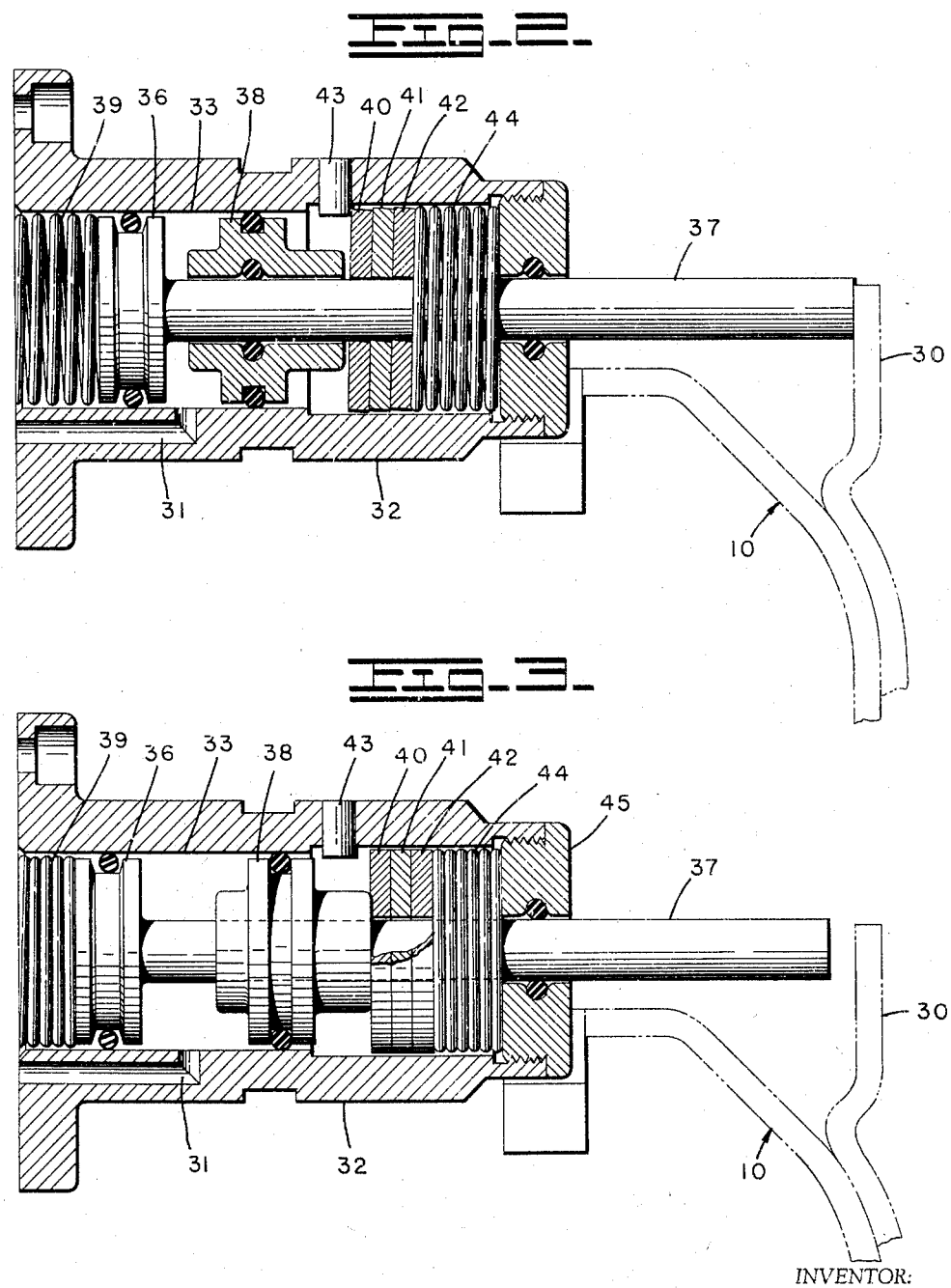

United States Patent Office

2,910,301
Patented Oct. 27, 1959

2,910,301

RETRACTABLE WORK-SUPPORT

Charles J. Mann, Traverse City, Mich.

Application October 13, 1958, Serial No. 766,939

7 Claims. (Cl. 279—4)

This invention provides a retractable work-support that has been developed in conjunction with diaphragm chucks, production fixtures, and other work-positioning devices. In handling high-production rotary machining operations, for example, it is desirable to engage and disengage a workpiece as quickly as possible without sacrificing the accuracy and concentricity of the engagement. The diaphragm chuck has established itself over many years as a device capable of providing this function. However, the workpieces which the chucks are called upon to handle are frequently of sufficiently thin and yieldable material as to create a problem in holding them. This is particularly true when projecting flanges or shoulders have to be machined, and when the material is positioned so that it is not either gripped by the jaws of the chuck or positioned by the fixed structure of the chuck. If workpieces are slammed up against reference surfaces prior to generating the gripping action of the chuck, a resilient shoulder or flange is sure to be bent from its natural free position. When machined in this attitude, the spring-back on release from the chuck results in displacement for the machined surface from the desired position. Similar conditions exist in fixed equipment. In many instances, it also becomes desirable to hold a workpiece gently but positively against a reference abutment.

The present invention provides an auxiliary piece of equipment which can be used for the support of projecting surfaces, or for providing auxiliary support or holding pressure to any part of a workpiece during a machining operation. In function, the support retracts out of interfering position during the period in which the jaws of the chuck are in the release position. The workpiece is then placed in engagement with the chuck, and the jaws permitted to engage. At this time, the natural function of the support will be to project itself up to the workpiece and engage it gently at that point. A locking function provides a solid support for the workpiece without generating forces which tend to deflect the supported areas. In the preferred form of the invention, the supporting mechanism operates from the same pneumatic system which creates the actuating forces for the diaphragm system, and the movement of the retractable support results from the interaction of suitable pistons, as will be described in the following specification. The several features of the invention will be discussed in detail through an analysis of the particular embodiments illustrated in the accompanying drawings. In the drawings:

Figure 1 presents an axial elevation showing a retractable work support embodying this invention installed in a conventional diaphragm chuck.

Figure 2 presents a sectional elevation on an enlarged scale showing the structural details of the retractable work support in the projected (supporting) position.

Figure 3 presents a view on a similarly enlarged scale to that of Figure 2, and showing the work support in the retracted position.

Referring to the drawings, the workpiece indicated at 10 in dotted lines is shown held in engagement with the diaphragm chuck generally indicated at 11. The resilient diaphragm 12 carries a group of jaws, one of which appears in Figure 1, and as indicated at 13. A group of these jaws is spaced around the axis of the device, and engages the periphery of the workpiece 10 to hold it tightly to generate the necessary torque for the rotative machining operation. A series of post assemblies is similarly grouped around the axis of the chuck, one of these post assemblies being shown at 14. The end of each of the assemblies is machined accurately to provide a reference abutment for the positioning of the workpieces as they are placed in engagement with the chuck. These post assemblies are fixed with respect to the frame of the chuck 11.

The back plate 15 of the chuck is secured to the spindle of the machine with bolts as indicated at 16, and a central plate 17 serves the principal function of providing a cylinder 18 within which an actuating piston 19 operates, the periphery of the piston being sealed by the O-ring 20. A normally tubular spindle (not shown) of the machine to which the chuck is attached provides for the admission of air pressure within the central opening 21 in the plate 15 and through the hole 22 in the central plate 17 into the area opposite the piston 19. The plate 23 serves the function of a cylinder head, with the member 24 operating in the manner of a piston rod to transfer axial forces to the diaphragm 12 to deflect it outwardly (to the right) and thereby increase the inscribed diameter within the jaws 13 and release workpieces. On release of the air pressure, the inscribed diameter defined by the jaws reduces to the point where workpieces are securely gripped by the resilience of the diaphragm. The O-ring 25 seals the space between the actuating member 24 and the cylinder head plate 23, and the O-ring 26 seals the central opening in the diaphragm to prevent the influx of foreign material into the chuck mechanism.

The passages 27 and 28 are machined into the central plate 17 at each point where the retractable work assemblies generally indicated at 29 are positioned. The function of these assemblies is to provide support for the cantilever flanges 30 on the workpiece 10.

The details of the support assemblies are best shown in Figures 2 and 3. The passage 31 is located in the housing 32 so that it forms a continuation of the passage 28 in the central plate of the chuck. The passage 31 leads into the cylinder 33 formed in the inside of the housing. The housing itself projects through an opening in the diaphragm 12 which is sealed by the group of O-rings 34, the periphery of the diaphragm being secured to the frame of the chuck by a group of bolts, one of which is shown at 35 in Figure 1.

The surge of air pressure which actuates the chuck shown in Figure 1 to the release position applies the same pressure to the cylinder 33 between the piston portion 36 of the supporting rod 37 and the free piston 38. These members are sealed against their respective working surfaces by O-rings as shown. The influx of air pressure tends to drive the supporting rod 37 to the left against the action of the spring 39, and to drive the free piston 38 to the right against the group of plates in the shape of washers 40, 41, and 42. These washers have a central opening which fits closely with the outside diameter of the rod 37, and they are engaged on one side near their periphery by the abutment pin 43 which is fixed with respect to the housing 32. The effect of the force applied by the free piston 38 is to straighten out these washers by the application of a central force which moves them clear of the pin 43 against the biasing action of the relatively light spring 44. When the washers have been released in this fashion, the air pressure on the piston portion 36 is then able to move the rod 37 to the left to the retracted position shown in Figure 3. Release of the air pressure permits the spring 39 to bias the rod 37 to the right, accompanied by the sliding of the washers 40–42 along the rod as the rod is projected against the flange 30 of the workpiece. Since the release of the air pressure removes the force of the floating piston 38 against the washers 40–42, the spring 44 is therefore able to urge the washers against the abutment pin 43 with a force which is eccentric to the pin and causes them to cant slightly with respect to the axis of the rod 37 so that the rod is locked securely against further movement to the left. This condition corresponds to the showing of Figure 2, and the forces imposed by the machining operations against the flange 30 are therefore resisted by a solid supporting action by the rod 37. The cap 45 is provided to facilitate the assembly operations and the entire unit is bolted to the central plate of the chuck by bolts as shown at 46 in Figure 1.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by prior art.

I claim:

1. In combination with a chuck provided with fluid-pressure actuating means, said chuck having a frame and also having jaw members positioned by said actuating means, said work support comprising: a housing normally fixed with respect to said frame and having cylinder means formed therein; a supporting rod slideable axially in said housing and having a piston portion engaging said cylinder means; a free piston slideable on said rod and engaging said cylinder means; a group of washers surrounding said rod on the opposite side of said free piston from said rod piston portion; abutment means mounted in said housing and engaging one side of said group of washers on the face thereof adjacent said free piston; first biasing means, said first biasing means urging said rod to projected position with respect to said housing; second biasing means, said second biasing means urging said group of washers eccentrically against said abutment means; and fluid inlet means communicating with said fluid pressure actuating means and with the space between said rod piston portion and said free piston.

2. In combination with a chuck provided with fluid-pressure actuating means, said chuck having a frame and also having jaw members positioned by said actuating means, a retractable work support comprising: a housing normally fixed with respect to said frame and having cylinder means formed therein; a supporting rod slideable axially in said housing and having a piston portion engaging said cylinder means; a free piston slideable on said rod and engaging said cylinder means; plate means surrounding said rod on the opposite side of said free piston from said rod piston portion; abutment means mounted in said housing and engaging one side of said plate means on the face thereof adjacent said free piston; first biasing means, said first biasing means urging said rod to projected position with respect to said housing; second biasing means, said second biasing means urging said plate means eccentrically against said abutment means; and fluid inlet means communicating with said fluid pressure actuating means and with the space between said rod piston portion and said free piston.

3. In combination with a chuck provided with actuating means, said chuck having a frame and also having jaw members positioned by said actuating means, a retractable work support comprising: a housing normally fixed with respect to said frame; a supporting rod slideable axially in said housing; a free member slideable with respect to said rod; holding means surrounding said rod; abutment means mounted in said housing and engaging one side of said holding means on the face thereof adjacent said free member; first biasing means, said first biasing means urging said rod to projected position with respect to said housing; second biasing means, said second biasing means urging said holding means eccentrically against said abutment means; and controllable biasing means for actuating said chuck and inducing relative movement between said rod and said free member against the action of said first and second biasing means.

4. A retractable work-support for a chuck provided with fluid-pressure actuating means, said chuck having a frame and also having jaw members positioned by said actuating means, said work support comprising: a housing normally fixed with respect to said frame and having cylinder means formed therein; a supporting rod slideable axially in said housing and having a piston portion engaging said cylinder means; a free piston slideable on said rod and engaging said cylinder means; a group of washers surrounding said rod on the opposite side of said free piston from said rod piston portion; abutment means mounted in said housing and engaging one side of said group of washers on the face thereof adjacent said free piston; first biasing means, said first biasing means urging said rod to projected position with respect to said housing; second biasing means, said second biasing means urging said group of washers eccentrically against said abutment means; and fluid inlet means communicating with the space between said rod piston portion and said free piston.

5. A retractable work-support for a chuck provided with fluid-pressure actuating means, said chuck having a frame and also having jaw members positioned by said actuating means, said work support comprising: a housing normally fixed with respect to said frame and having cylinder means formed therein; a supporting rod slideable axially in said housing and having a piston portion engaging said cylinder means; a free piston slideable on said rod and engaging said cylinder means; plate means surrounding said rod on the opposite side of said free piston from said rod piston portion; abutment means mounted in said housing and engaging one side of said plate means on the face thereof adjacent said free piston; first biasing means, said first biasing means urging said rod to projected position with respect to said housing; second biasing means, said second biasing means urging said plate means eccentrically against said abutment means; and fluid inlet means communicating with the space between said rod piston portion and said free piston.

6. A retractable work-support for a chuck provided with fluid-pressure actuating means, said chuck having a frame and also having jaw members positioned by said actuating means, said work support comprising: a housing normally fixed with respect to said frame and having cylinder means formed therein; a supporting rod slideable axially in said housing and having a piston portion engaging said cylinder means; a free piston slideable on said rod and engaging said cylinder means; holding means surrounding said rod on the opposite side of said free piston from said rod piston portion; abutment means mounted in said housing and engaging one side of said holding means on the face thereof adjacent said free piston first biasing means, said first biasing means urging said rod to projected position with respect to said housing; second biasing means, said second biasing means urging said holding means eccentrically against said abutment means; and fluid inlet means communicating with the space between said rod piston portion and said free piston.

7. A retractable work-support for a chuck provided with actuating means, said chuck having a frame and also having jaw members positioned by said actuating means, said work support comprising: a housing normally fixed with respect to said frame; a supporting rod slideable axially in said housing; a free member slideable with respect to said rod; holding means surrounding said rod; abutment means mounted in said housing and engaging one side of said holding means on the face thereof adjacent said free member; first biasing means, said first biasing means urging said rod to projected position with respect to said housing; second biasing means, said second biasing means urging said holding means eccentrically against said abutment means; and controllable biasing means for inducing relative movement between said rod and said free member against the action of said first and second biasing means.

References Cited in the file of this patent

FOREIGN PATENTS 756,164     Great Britain _____ Aug. 29, 1956